| United States Patent [19]
Coon

[11] B 3,981,975
[45] Sept. 21, 1976

[54] PREPARATION OF ANHYDROUS NITRIC ACID
[75] Inventor: Clifford L. Coon, Menlo Park, Calif.
[73] Assignee: Koppers Company, Inc., Pittsburgh, Pa.
[22] Filed: Feb. 12, 1975
[21] Appl. No.: 549,198
[44] Published under the second Trial Voluntary Protest Program on January 13, 1976 as document No. B 549,198.

Related U.S. Application Data
[63] Continuation of Ser. No. 369,309, June 12, 1973, abandoned.

[52] U.S. Cl. .............................. 423/390; 423/523; 252/189; 260/644
[51] Int. Cl.² ................. C01B 21/46; C07C 79/12
[58] Field of Search ........... 423/390, 523; 260/644, 260/688; 252/182, 189; 210/211

[56] References Cited
OTHER PUBLICATIONS
Genich et al., "Izv. Akad. Nauk. Ser. Khim.," USSR, 1966, pp. 66–69, Abst. "Chemical Abst." Vol. 64. p. 15183.

Plesch et al., "Chemistry & Industry" Sept. 1971, pp. 1043–1044.

*Primary Examiner*—G. O. Peters
*Attorney, Agent, or Firm*—Oscar B. Brumback; Herbert J. Zeh, Jr.

[57] ABSTRACT

A method for preparing anhydrous nitric acid comprising extracting an aqueous mixture of nitric acid and sulfuric acid with methylene chloride to yield a solution of anhydrous nitric acid in methylene chloride. The anhydrous nitric acid can be isolated from the methylene chloride by distillation or crystallization. Alternatively, the anhydrous solution of nitric acid in methylene chloride may be used directly. The methylene chloride extract of the nitric acid-sulfuric acid mixture is a useful nitrating agent.

9 Claims, No Drawings

PREPARATION OF ANHYDROUS NITRIC ACID

This is a continuation of application Ser. No. 369,309 filed June 12, 1973, now abandoned.

BACKGROUND OF THE INVENTION

This invention is directed to a method for preparing anhydrous nitric acid. More particularly, this invention is directed to a method for preparing anhydrous nitric acid by extracting an aqueous mixture of nitric acid and sulfuric acid with methylene chloride. The anhydrous nitric acid can be used as a solution in methylene chloride or isolated from the methylene chloride by distillation or crystallization.

Nitric acid is generally produced by the standard ammonia oxidation process as an aqueous solution in a concentration of from about 50 to about 70 percent by weight. Concentrations in this range are generally suitable for producing inorganic compounds such as ammonium nitrate and the like. However, for organic nitrations and many other uses anhydrous nitric acid is required. Since nitric acid forms an azeotrope with water at a concentration of about 68 percent by weight, the water cannot be separated by simple distillation. Heretofore, two methods have been commercially employed for making anhydrous nitric acid. These methods are extractive distillation and reaction with additional nitrogen oxides.

The most common method for producing anhydrous nitric acid (98–100 percent nitric acid) comprises distillation of a weak nitric acid with concentrated sulfuric acid, the sulfuric acid serving effectively as a dehydrating agent. In the Chemico concentration process 60 percent nitric acid is mixed with 93 percent sulfuric acid in a Raschig ring packed dehydrating tower provided with a steam-heated reboiler. The nitric acid vapor is distilled overhead and condensed while the sulfuric acid and water leave the bottom at a concentration of about 70 percent sulfuric acid. Water is then removed from the sulfuric acid in a concentrator and the sulfuric acid is recycled to the process.

An alternative to sulfuric acid which has found more recent application is a 72 percent solution of magnesium nitrate in water. The nitrate solution typically leaves the distillation column at a concentration of about 68 percent and is reconcentrated by flashing to a steam heated vacuum drum. The use of magnesium nitrate has been found to be more economical in smaller plants, particularly where existing sulfuric acid concentrating facilities are not available or where a sulfate free nitric acid is required.

Another method for producing anhydrous nitric acid which has gained widespread use, particularly in Europe, is the reaction with nitrogen oxides. Nitrogen tetroxide is separated from the process gases leaving the ammonia converter by refrigeration or by absorption in concentrated nitric acid. The tetroxide is then autoclaved with weak nitric acid and oxygen to yield a 98 percent product.

While the above mentioned processes are suitable for producing 98 percent plus nitric acid there is a need for improved processes which will produce anhydrous nitric acid. Therefore, it is the object of this invention to provide a new process for preparing anhydrous nitric acid.

Anhydrous perchloric acid has been prepared by extraction of a perchloric acid-oleum solution with methylene chloride. See the article by P. H. Plesch et al., "Chemistry and Industry," September, 1971, pp. 1043 and 1044.

SUMMARY OF THE INVENTION

I have discovered a new and improved process for preparing anhydrous nitric acid. The process comprises extracting an aqueous mixture of sulfuric acid and nitric acid with methylene chloride. The anhydrous nitric acid may be utilized as a methylene chloride solution. The anhydrous nitric acid may be isolated from the methylene chloride solution by distillation or crystallization. The methylene chloride may be distilled off leaving anhydrous nitric acid. Alternatively the methylene chloride solution of the anhydrous nitric acid may be cooled to below −50°C. At these temperatures the nitric acid crystallizes from the solution and may be recovered by filtration.

The term anhydrous nitric acid as used herein means nitric acid containing less then two percent (2%) by weight of water.

As mentioned above, the method of my invention is a liquid extraction of anhydrous nitric acid from an aqueous mixture of nitric acid and sulfuric acid. The extracting liquid is methylene chloride. I have found that when the extraction of the aqueous acid mixture with methylene chloride is performed the resulting methylene chloride raffinate contains anhydrous nitric acid with only a very small amount of water and only trace amounts of sulfate. While not intending to be bound by any theories, it is postulated that two reasons are either singularly or in combination responsible for being able to obtain anhydrous nitric acid by methylene chloride extraction. The one is that it is known that nitric acid and methylene chloride form some type of loose complex. Therefore, this enables the nitric acid to transfer from the aqueous solution into the methylene chloride without carrying along quantities of water. The other reason is that sulfuric acid is a well known dehydrating agent. Therefore, by extracting from an aqueous solution containing relatively high concentrations of sulfuric acid the amount of water which is transferred into the methylene chloride raffinate phase is greatly reduced.

The concentrations of nitric acid and sulfuric acid in the aqueous solution may vary over a wide range. However, as the concentration of nitric acid in the aqueous solution decreases the amount of anhydrous nitric acid that is extracted per unit volume of methylene chloride used also decreases. Therefore, it is preferred for economic considerations to use initially high concentrations of nitric acid. The initial concentration of nitric acid should be greater than 40 percent and preferably around 65–70 percent.

Similarly, as the concentration of sulfuric acid decreases the effectiveness of the sulfuric acid as a dehydrating agent also decreases. Therefore, it is desirable to keep the concentration of sulfuric acid as high as practical. The initial concentration of sulfuric acid should be greater than 80 percent and preferably greater than 90 percent.

The aqueous solution containing nitric acid and sulfuric acid is most conveniently prepared by simply mixing a concentrated nitric acid solution with a concentrated sulfuric acid solution. The concentrated nitric acid solution will generally be from about 50 to 70 percent by weight. Preferably it will be close to 70 percent by weight. The concentrated sulfuric acid solution will generally be from about 90 percent to 98 percent by weight.

The extraction of anhydrous nitric acid from the aqueous acid mixture with methylene chloride may be accomplished by using any conventional liquid extraction techniques. The methylene chloride is admixed with the aqueous acid and the resulting mixture agitated. The methylene chloride raffinate is then separated from the aqueous acid solution by any conventional liquid separation techniques.

The resulting solution of anhydrous nitric acid in methylene chloride may be used as is. Alternatively, the anhydrous nitric acid may be separated from the methylene chloride by boiling off the methylene chloride or by cooling the solution to temperatures below about −50°C and filtering out the crystallized anhydrous nitric acid.

The extraction of the anhydrous nitric acid may be accomplished by a single extraction of the nitric-sulfuric mixture with a large volume of methylene chloride. It is preferable to carry out the extraction by using successive extractions with smaller volumes of methylene chloride. The use of successive smaller volumes is generally more efficient than the use of one large volume of extracting solvent. The extraction will most often be accomplished on a commercial scale by using a continuous countercurrent extractor. The countercurrent technique gives the maximum amount of extraction for a given quantity of extracting solvent.

As mentioned above, after the extraction the solution of anhydrous nitric acid in methylene chloride may be used as desired. Alternatively, the anhydrous nitric acid may be separated from the methylene chloride raffinate. After extraction, the aqueous solution of nitric acid and sulfuric acid will contain concentrations of nitric acid and sulfuric acid which are too dilute to be used for any further practical extractions of anhydrous nitric acid. The aqueous mixture of acids may then be discarded and a fresh solution prepared for extraction. However, these extracted aqueous acid solutions may contain fairly high concentrations of nitric acid (≈40–50 percent) and sulfuric acid (≈60–80 percent). Therefore, it is preferred that these solutions be concentrated by removing some water. They can then be used for further extractions or mixed with fresh acid solutions and extracted with methylene chloride.

I have found that the methylene chloride extract is a useful nitrating agent. The methylene chloride extract is capable of nitrating 9,10 dihydroanthracene to 9,10 dinitroanthracene. Heretofore, the nitration of 9,10 dihydroanthracene by prior art methods resulted in a mixture of nitrated products. However, nitration with the methylene chloride extract yields pure 9,10 dinitroanthracene.

The methylene chloride extract is a very useful nitrating agent for compounds which are sensitive to oxidation. I have nitrated phenol using the methylene chloride extract and have obtained a mixture of mono-and dinitrophenols without oxidation of the phenol.

Numerous experiments have been performed demonstrating the effectiveness of my invention. The following examples are illustrative of the experiments. They should be construed to illustrate the invention but not to limit the same.

EXAMPLE 1

A solution was prepared by mixing 53.0 ml of 70 percent nitric acid (52.7 gms., 0.837 mol) with 47 ml of 96 percent sulfuric acid (82.1 gm., 0.83 mol). The aqueous acid mixture was then extracted successively with seven 100 ml portions of methylene chloride. The extractions were carried out by shaking the aqueous acid solution-methylene chloride mixture vigorously for several minutes and allowing the phases to separate during a 5–10 minute period. The methylene chloride raffinate was then isolated and analyzed. The methylene chloride extract contained only trace quantities of sulfate and water. The results are shown in Table I below:

Table I $CH_2Cl_2$ Extractions of $HNO_3$ From $H_2SO_4/HNO_3$ Mixtures

| Extraction No. | Vol ml | $HNO_3$ gm | $HNO_3$ % | $HNO_3$ Total % |
|---|---|---|---|---|
| 1 | 100 | 15.7 | 29.8 | 29.8 |
| 2 | 100 | 9.2 | 17.5 | 47.3 |
| 3 | 100 | 6.3 | 12.0 | 59.3 |
| 4 | 100 | 4.6 | 8.7 | 68.0 |
| 5 | 100 | 3.2 | 6.1 | 74.1 |
| 6 | 100 | 2.3 | 4.4 | 78.5 |
| 7 | 100 | 1.7 | 3.2 | 81.7 |

EXAMPLE 2

A solution was prepared by mixing 53.0 ml of 70 percent nitric acid with 47.0 ml of 96 percent sulfuric acid. The aqueous acid mixture was then extracted with 300 ml of methylene chloride. The methylene chloride raffinate was then analyzed. The methylene chloride contained 27.3 gms (51.8 percent) of anhydrous nitric acid and only a trace quantity of sulfuric acid. This may be compared to 31.2 gm (59.3 percent) which was obtained for three 100 ml extractions.

EXAMPLE 3

This example demonstrates the effectiveness of methylene chloride when compared to other chlorinated solvents.

Identical solutions were prepared by mixing 53.0 ml of 70 percent nitric acid and 47.0 ml of 96 percent sulfuric acid. A comparison of the efficiency of anhydrous nitric acid extraction for methylene chloride, chloroform, and carbon tetrachloride was made using 100 ml portions of each of these chlorinated solvents. The acid-chlorinated solvent mixtures were vigorously agitated for several minutes and the phases allowed to separate for ten (10) minutes. The chlorinated solvent raffinates where then analyzed. The results are shown in Table II.

Table II

| Extraction Solvent | $HNO_3$ Extracted in gms | % $HNO_3$ Extracted |
|---|---|---|
| $CH_2Cl_2$ | 13.6 | 25.8 |
| $CHCl_3$ | 5.3 | 9.5 |
| $CCl_4$ | 1.23 | 2.3 |

EXAMPLE 4

This example demonstrates the necessity of sulfuric acid. A 70 percent nitric acid solution was extracted with methylene chloride and the methylene chloride raffinate analyzed. 100 ml of a 70 percent $HNO_3$ solution was extracted with 100 ml of methylene chloride. The methylene chloride raffinate contained about three grams (about 4 percent) of anhydrous nitric acid.

EXAMPLE 5

A solution of 47 ml of 96 percent $H_2SO_4$ and 53 ml of 70 percent $HNO_3$ was extracted with methylene chloride by vigorously stirring for thirty (30) minutes. The methylene chloride raffinate was then separated from the aqueous acid mixture. Then 100 ml of the methylene chloride extract was added dropwise over a twenty-five minute period to 2.9 gms of 9,10 dihydroanthracene in 25 ml of methylene chloride. The temperature of the reaction was maintained between −5° and 0°C. When addition of the methylene chloride extract of the nitric acid-sulfuric acid mixture was almost complete, yellow needles began to separate from solution. After stirring for an additional sixty (60) minutes at temperatures slightly below 0°C, the yellow crystals were collected by filtration (3.3 gm≈78 percent). Recrystallization from xylene gave 3.1 g of long yellow needles having a melting point of 304°–306°. This product was identified as 9,10 dinitroanthracene by comparison of its infrared spectrum with that of a known sample.

The nature of this methylene chloride extract appears to be essentially a methylene chloride solution of about 100 percent nitric acid and a trace of some other reagent, possibly $(NO_2)_2SO_4$ or $NO_2HSO_4$ or $H_2SO_4$. The methylene chloride extract is reactive enough to nitrate toluene at −55°C but gentle enough to prevent oxidation of sensitive compounds such as phenol or 9,10 dihydroanthracene during nitration.

EXAMPLE 6

An aqueous solution of nitric acid and sulfuric acid was extracted with methylene chloride (similar to Example 1). The methylene chloride raffinate was cooled to below −55°C (−60° to −80°C). Large white needle crystals separated out at this temperature and were isolated by filtration. The crystals were 100 percent anhydrous nitric acid.

EXAMPLE 7

An aqueous solution of nitric acid and sulfuric acid was extracted with methylene chloride (similar to Example 1). The methylene chloride extract was evaporated by boiling off the methylene chloride. The colorless liquid that remained was analyzed. Analysis indicated that the colorless liquid was 98–100 percent anhydrous nitric acid with a trace of sulfate.

What is claimed is:

1. A method for preparing a solution of anhydrous nitric acid in methylene chloride comprising extracting an aqueous mixture of nitric acid and sulfuric acid with methylene chloride.

2. A method as in claim 1 wherein the initial concentration of nitric acid is greater than about 40% by weight and the initial concentration of sulfuric acid is greater than about 80% by weight.

3. A method as in claim 1 wherein the initial concentration of nitric acid is greater than about 65% by weight and the initial concentration of sulfuric acid is greater than about 90% by weight.

4. A method for preparing anhydrous nitric acid comprising:
   a. preparing an aqueous solution of nitric acid and sulfuric acid;
   b. extracting the aqueous acid mixture with methylene chloride;
   c. separating the anhydrous nitric acid from the methylene chloride raffinate.

5. A method as in claim 4 wherein the initial concentration of nitric acid is greater than about 40% by weight and the initial concentration of sulfuric acid is greater than about 80% by weight.

6. A method as in claim 4 wherein the initial concentration of nitric acid is greater than about 65% by weight and the initial concentration of sulfuric acid is greater than about 90% by weight.

7. A method as in claim 4 wherein the anhydrous nitric acid is separated from the methylene chloride by boiling off the methylene chloride.

8. A method as in claim 4 wherein the anhydrous nitric acid is separated by crystallizing the anhydrous nitric acid from the methylene chloride at temperatures below about −50°C and recovering the crystals by filtration.

9. A method for preparing anhydrous nitric acid comprising:
   a. preparing an aqueous solution of nitric acid and sulfuric acid wherein the concentration of nitric acid is greater than about 65% by weight and the concentration of sulfuric acid is greater than about 90% by weight.
   b. extracting the aqueous acid mixture with methylene chloride.
   c. separating the anhydrous nitric acid from the methylene chloride raffinate by boiling off the methylene chloride.

* * * * *